United States Patent [19]
Kawai

[11] Patent Number: 5,819,254
[45] Date of Patent: Oct. 6, 1998

[54] METHOD OF TRANSFERRING DATA BETWEEN RELATIONAL DATABASE TABLES

[75] Inventor: Kenji Kawai, Seattle, Wash.

[73] Assignee: Wall Data Incorporated, Kirkland, Wash.

[21] Appl. No.: 685,237

[22] Filed: Jul. 23, 1996

[51] Int. Cl.⁶ .................................................. G06F 17/30
[52] U.S. Cl. ............................................. 707/2; 707/102
[58] Field of Search ....................... 707/2, 102; 364/300; 395/500

[56] References Cited

U.S. PATENT DOCUMENTS

| | | | |
|---|---|---|---|
| 4,930,071 | 5/1990 | Tau et al. ................................. | 364/300 |
| 5,212,787 | 5/1993 | Baker et al. ................................. | 707/2 |
| 5,548,749 | 8/1996 | Kroenke et al. ......................... | 707/102 |
| 5,615,367 | 3/1997 | Bennett et al. .......................... | 707/102 |

FOREIGN PATENT DOCUMENTS 0 560 543 A2  9/1993  European Pat. Off. .

OTHER PUBLICATIONS

I.B.M. Corporation: "Method for Import With Replace That Eliminates Filing the Log File", *IBM Technical Disclosure Bulletin*, 31(11):447–448, (Apr. 1989), New York, New York.

*Primary Examiner*—Thomas G. Black
*Assistant Examiner*—Shahid Alam
*Attorney, Agent, or Firm*—Christensen, O'Connor, Johnson & Kindness PLLC

[57] ABSTRACT

A method of generating a computer system to determine a sequence of data transfers required to move data from one or more tables in a source database into a corresponding destination table in a relational database. A randomly ordered list of destination tables is created and sorted such that the destination tables are arranged in a least dependent order so that data is moved into tables before data is moved into tables that contain foreign keys.

2 Claims, 4 Drawing Sheets

METHOD OF TRANSFERRING DATA BETWEEN RELATIONAL DATABASE TABLES

FIELD OF THE INVENTION

The present invention relates to database systems in general, and in particular to methods of transferring data between relational database tables.

BACKGROUND OF THE INVENTION

As personal computers become more integrated into the work and home environments, they are increasingly being used by noncomputer experts to store and retrieve data. Currently, the most popular way of storing information in a computer is to use a commercial database program. Most database programs for personal computers create relational databases whereby data is stored in tables that are linked to each other through one or more foreign keys. In the past, a user had to be fairly computer literate in order to create and maintain the tables in which data is stored. Wall Data Corporation of Kirkland, Wash., has developed a program called SALSA™ that automatically creates a relational database from a semantic object model that describes the data the user wishes to store. In the SALSA program, a user creates the semantic object model and the program then automatically generates the required tables as well as forms for entering data into the tables and reports for retrieving data from them.

In some instances, a user may create a new relational database using the SALSA program but wish to fill the database tables with data from a previously created database. In that case, the user must import the data from the old database tables into the newly created database tables. If the data is not moved in the correct sequence, the integrity of the data may not be maintained, causing database errors.

SUMMARY OF THE INVENTION

The present invention is a computer system that operates to automatically determine a sequence in which data is to be moved from an existing relational database to a database created from a corresponding semantic object model. To move the data between two tables, a user is presented with a window representing a table in the source database and a table in the newly created destination database. The user selects one or more columns in the source database and associates them with a corresponding column in the destination database. A data structure describing the data to be moved between the source/destination tables is placed into a list. To preserve the data integrity, the computer system sorts the list in a least dependent order so that the destination tables having foreign keys to other tables are filled with data after the tables to which the foreign keys refer.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENT

As described above, the present invention is a system for automatically determining a sequence of steps for moving data from the tables of an existing relational database to the tables of a newly created database. In the preferred embodiment of the invention, the new database is created using a semantic object model in the manner described in U.S. patent application Ser. No. 08/145,997, filed Oct. 29, 1993, and herein incorporated by reference. However, the present invention applies equally to databases created by other means, such as by hand using a database program such as Microsoft ACCESS™.

Figure 1:
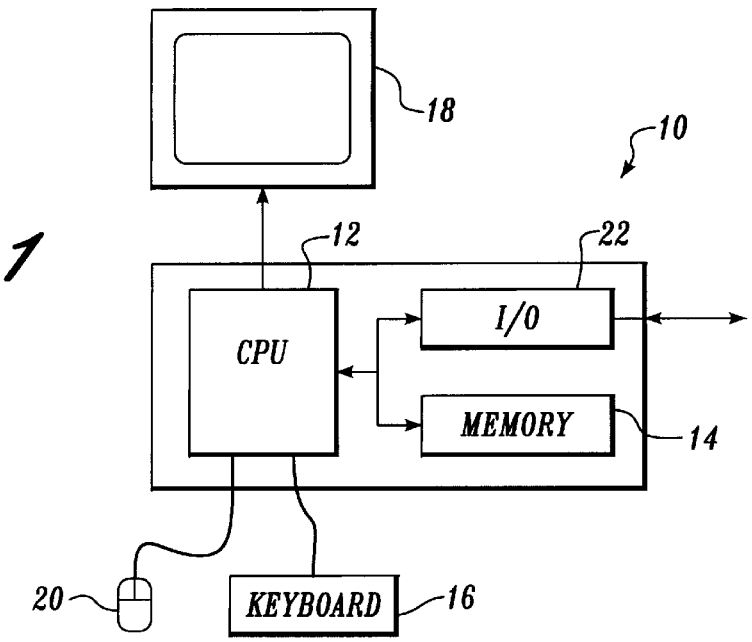
FIG. 1 shows a representative computer system in which the present invention is implemented.

The present invention is implemented in a general purpose programmable computer system of the type illustrated in FIG. 1. The computer system 10 comprises a central processing unit 12, an associated memory 14 as well as a keyboard 14, monitor 16, and pointing device 16, such as a mouse. In addition, the computer may include input/output circuitry 22 for receiving or transmitting data to a remote location.

Stored in the memory of the computer system are a series of program steps that when executed by the central processing unit perform the steps described below.

Figure 2:
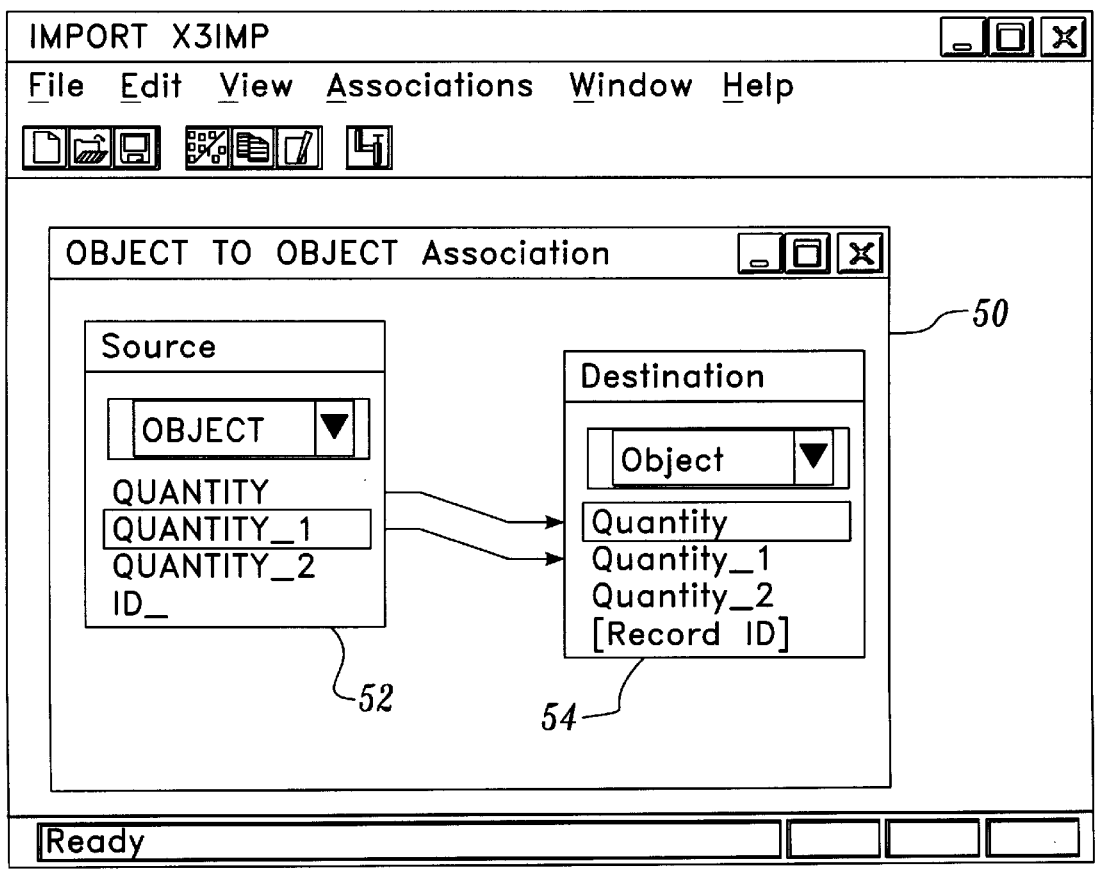
FIG. 2 shows a representative window displayed on the computer system in which a user can identify a source table in an existing database and a destination table in a newly created database.

FIG. 2 illustrates a window 50 that is displayed on the monitor of the computer when a user of the SALSA program wants to import data from an existing relational database into a newly created database. The window 50 includes a smaller window 52 that represents a table in the source database from which the data will be read and a second, smaller window 54 that represents a table in the destination database into which the data will be written. The windows 52 and 54 each includes a list of the columns in their corresponding tables. The columns in the destination table may or may not have the same name as the columns in the source table. The user manually selects which column in the source database is to be moved into which column in the corresponding destination database. The selection is shown as an arrow extending between the column names in the two windows. If the data types do not agree between the columns, a data conversion takes place, if possible, in order to attempt to satisfy the action desired by a user. The window 50 represents a data transfer between a single source table and a single destination table. To move data between another pair of tables, another window 50 appears and the user selects which columns of the source table are moved to which columns of the destination table.

Figure 3A:
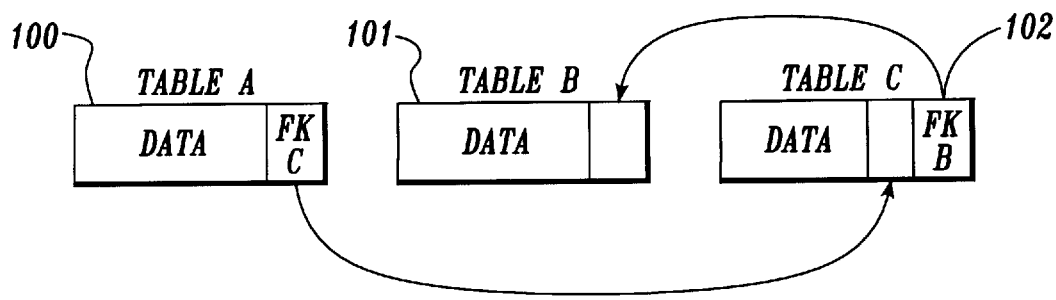
FIG. 3A represents three tables in the destination database that contain foreign keys to each other.

FIG. 3A illustrates three relational tables in the destination database. Table A 100 contains a foreign key to Table C 102, while Table C contains a foreign key to Table B 104. Table B does not contain any foreign keys and is therefore referred to as the "least dependent table." When data is written into a relational database, it must be done in a sequence that maintains referential integrity. For example, if Table C represents an employee having a unique ID number and a column in Table A stores the ID number as a foreign key, it is necessary to insert foreign key values in Table A after Table C is populated with corresponding ID values.

As described above, a separate window 50 is provided for each pair of tables between which the user wishes to move data. When interacting with the window 50, the computer system creates instances of a data structure that defines a source table, a destination table and a list of which columns in the source table that are to be moved into columns of the destination table. Each instance of the data structure is placed into a list ("Tablelist") as the windows 50 are used.

Because it is not possible to know ahead of time in which order the user will define the data movement between tables, the order of the entries in the Tablelist is defined is random. For example, in FIG. 3B, the sample Tablelist 106 includes Table C at the head of the list, Table A in the middle of the list and Table B at the tail of the list. The arrangement of tables in the Tablelist represents the order in which the user defined the data to be written into these destination tables. In order to preserve data integrity, the entries in the Tablelist must be arranged so that the data is written into the least dependent table first, followed by those tables that contain foreign keys to the least dependent table.

Figure 4:
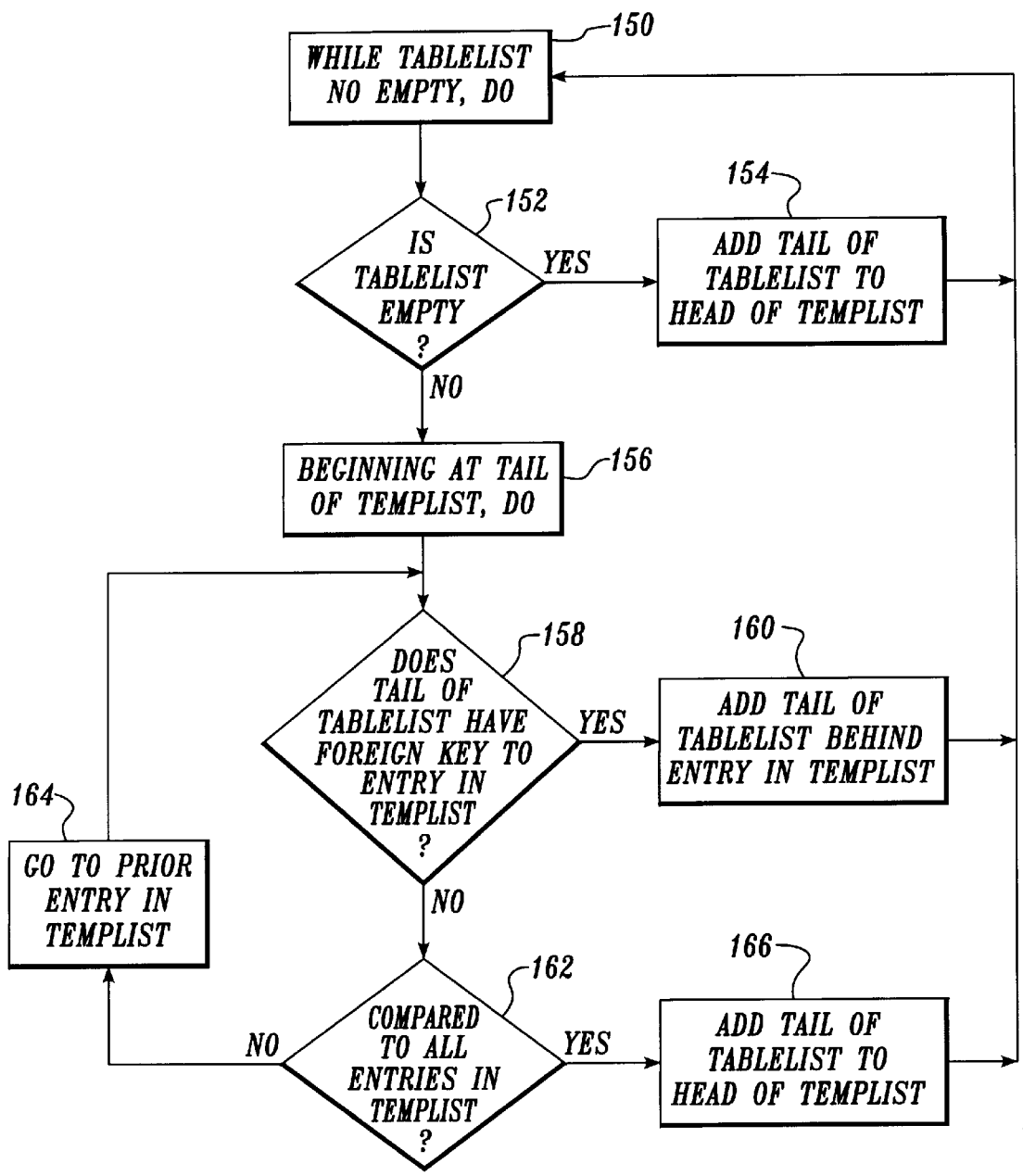
FIGS. 4 and 5 are flow charts of the steps taken by the computer system of the present invention to determine the sequence in which data should be moved from the source database.

FIG. 4 is a flow chart of the steps performed by the computer that is programmed in accordance with the present invention to arrange the sequence of data moves between tables so that data integrity is preserved. Beginning at a step 150, the computer system begins a loop that operates while the Tablelist is not empty. At a step 152, the computer system determines whether a second list, Templist, is empty. If so, the last entry or tail of the Tablelist is moved to the head of the Templist at step 154 and processing returns to step 150. If the answer to step 152 is "no," then the computer system moves to the tail end of the temporary list. At step 164 the computer system determines whether the tail of the Tablelist has a foreign key to the last entry in the Templist at step 158. If so, then the computer systems adds the tail of the Tablelist behind the last entry in the Templist at step 160, and processing then returns to step 150. If the answer to step 158 is "no," then the computer system determines whether the entry at the tail of the Tablelist has been compared to all of the entries in the Templist at step 162. If not, the computer system proceeds to step 154 and a pointer that marks the entry in the Templist to which entries in the Tablelist are compared is advanced towards the head of the Templist. If the answer to step 162 is "yes," then the tail of the Tablelist is moved to the head of the Templist before processing returns to step 150.

Figure 5:
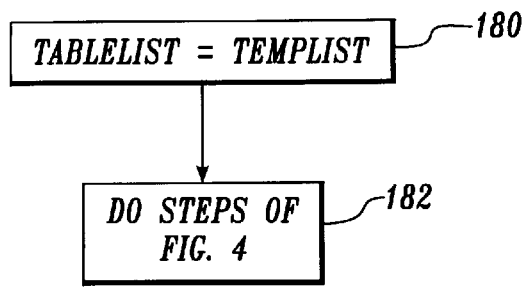

One pass through the steps shown in FIG. 4 is insufficient to insure that data will be written into the destination tables in a manner that will preserve the data integrity. Thus, processing proceeds to the steps shown in FIG. 5 whereby the Tablelist is redefined as the Templist at step 80, and the steps shown in FIG. 4 are performed again at step 182.

Figure 3B:
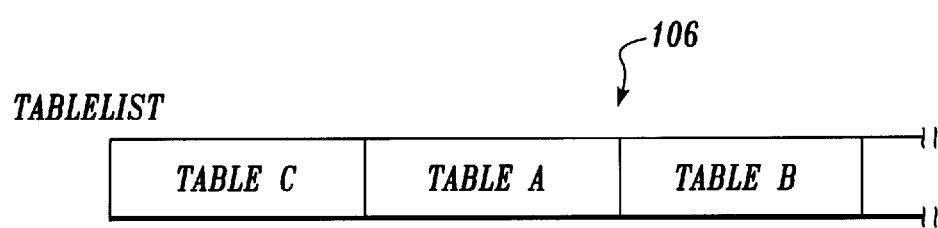
FIG. 3B represents a list of destination tables arranged in a random order.
Figure 6:
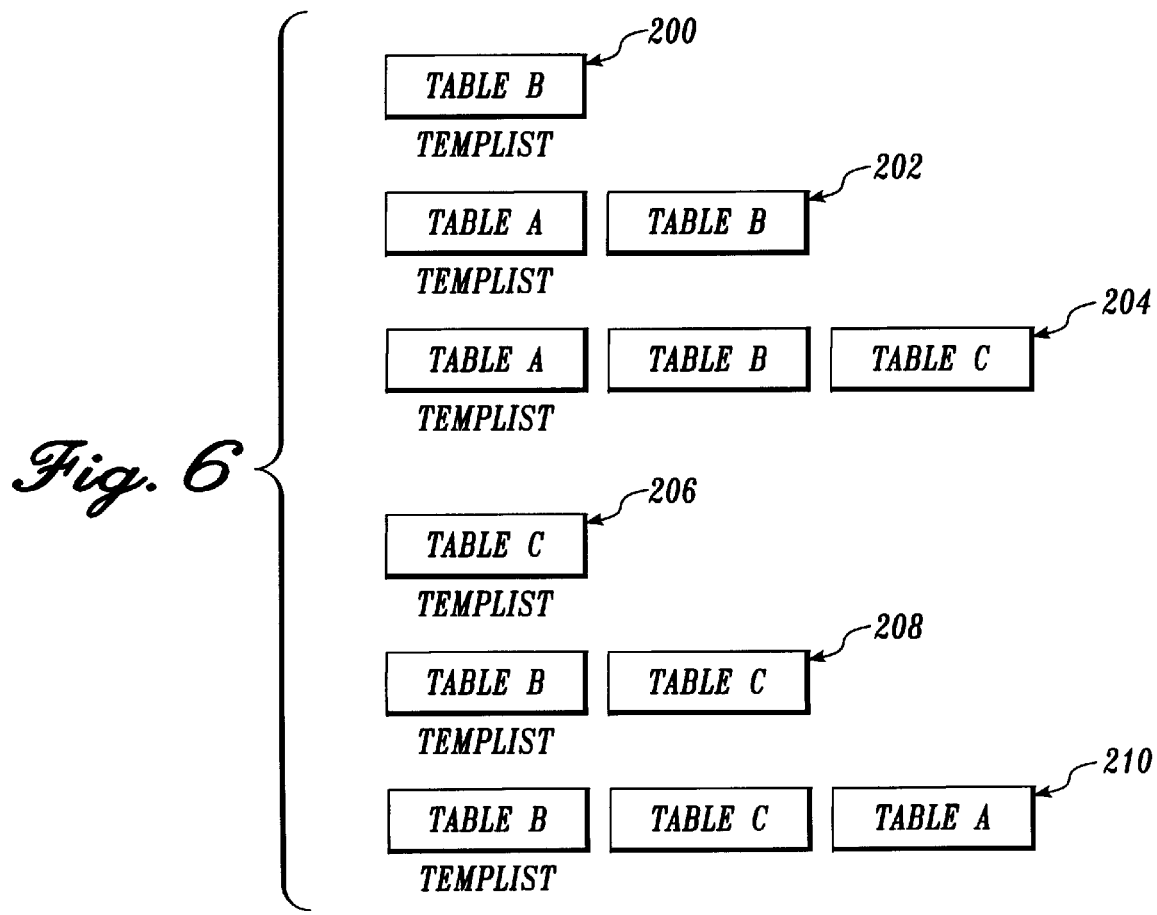
FIG. 6 illustrates how the steps shown in FIGS. 4 and 5 arrange the list of destination tables in a least dependent order.

FIG. 6 graphically illustrates the results of the steps shown in FIG. 4 for the sample Tablelist shown in FIG. 3B. At the end of the first pass represented by 200, Table B is at the head of the Templist. At 202, Table A is placed ahead of Table B in the Templist because Table A does not contain a foreign key to Table B. At 204, Table C is compared to Table B at the end of the list. Because Table C contains a foreign key to Table B, it is placed after Table B in the Templist. Thus, at the end of one pass, the Templist is comprised of Table A, Table B and Table C. However, this order is not correct because Table A contains a foreign key to Table C. Therefore, data to be written into Table A must be done after the data is written into Table C in order to preserve data integrity.

The Templist at 206 represents the first entry in the list during the second pass through the steps shown in FIG. 3. When the Templist is empty, Table C is at the head of the list. Next, Table B is compared to Table C, and because Table B does not contain a foreign key to Table C, it is placed ahead of Table C in the list at 208. Finally, Table A is compared to each element in the temporary list beginning at the tail end of the list. Table A contains a foreign key to Table C and is therefore placed behind Table C in the list at 210. After two passes through the step shown in FIG. 4, the Templist is ordered as Table B, Table C, Table A. Once the tables have been arranged in their least dependent order, the computer system executes a sequence of SQL commands that read the data from the source table and write the data to the destination table. The least dependent ordering of the destination tables will preserve data integrity as data is moved from the source tables to the destination tables.

One problem that may occur in the destination database is where the foreign keys define a circular path. When multiple tables have a circular depending loop, e.g., Table B has a foreign key to Table A in the above example, there is no correct ordering possible. Any final ordering depends on the source database. The SALSA program does not declare those columns as foreign keys when a circular dependency loop is detected. Data integrity in these cases must be maintained apart from the database by the SALSA program itself.

As will be appreciated from the above description, changes may be made to the invention without departing from the spirit and scope of the invention. For example, it is not necessary that the destination tables be created from a corresponding semantic object model. Any database program could be used to generate the destination tables.

The embodiments of the invention in which an exclusive property or privilege is claimed are defined as follows:

1. A method of operating a computer system to determine a sequence in which data should be moved from a number of source tables to a number of destination tables in a relational database, comprising the steps of:

determining a number of pairs of database tables, each pair including at least one table in a source relational database and at least one table in a destination database; and sorting the number of pairs of database tables by determining if each destination table has a foreign key to another destination table in the number of pairs of database tables and, if so, arranging the number of pairs of database tables in a sequence so that tables having a foreign key are filled with data from a source table after the destination table to which the foreign key refers; and repeating the steps of determining if each destination table has a foreign key to another destination table and arranging the sequence to ensure that the tables are in a least dependent order.

2. The method of claim 1, further comprising the step of detecting if the destination tables define a circular depending loop and if so, not declaring the columns in the destination tables as foreign keys.

* * * * *